United States Patent

[11] 3,602,768

[72] Inventors Roy M. Williams, Jr.
Nashua;
Crawford M. Kus, Hudson, both of, N.H.

[21] Appl. No. 811,155
[22] Filed Mar. 27, 1969
[45] Patented Aug. 31, 1971
[73] Assignee Sanders Associates, Inc.
Nashua, N.H.

[54] DUAL MODE DEFLECTION AMPLIFIER
14 Claims, 1 Drawing Fig.

[52] U.S. Cl. .......... 315/27 TD, 315/18, 315/27 R
[51] Int. Cl. .......... H01j 29/76
[50] Field of Search .......... 315/27, 18, 27 T D

[56] References Cited
UNITED STATES PATENTS
3,440,485 4/1969 Nix .......... 315/27

*Primary Examiner*—Rodney D. Bennett Jr.
*Assistant Examiner*—Joseph G. Baxter
*Attorney*—Louis Etlinger

ABSTRACT: There is disclosed a deflection amplifier for a cathode-ray ray tube which normally acts as a linear amplifier to enable operation in a random access mode. However, an input signal commanding the beam to move linearly across the screen followed by an input signal commanding a fast return, or fly back, automatically shifts operation to an energy recovery mode in which energy is transferred from the deflection coil to a capacitor and back again. During this operation, the power supply and the input stages are automatically disconnected, but are automatically reconnected as the fly back is completed.

PATENTED AUG 31 1971 3,602,768
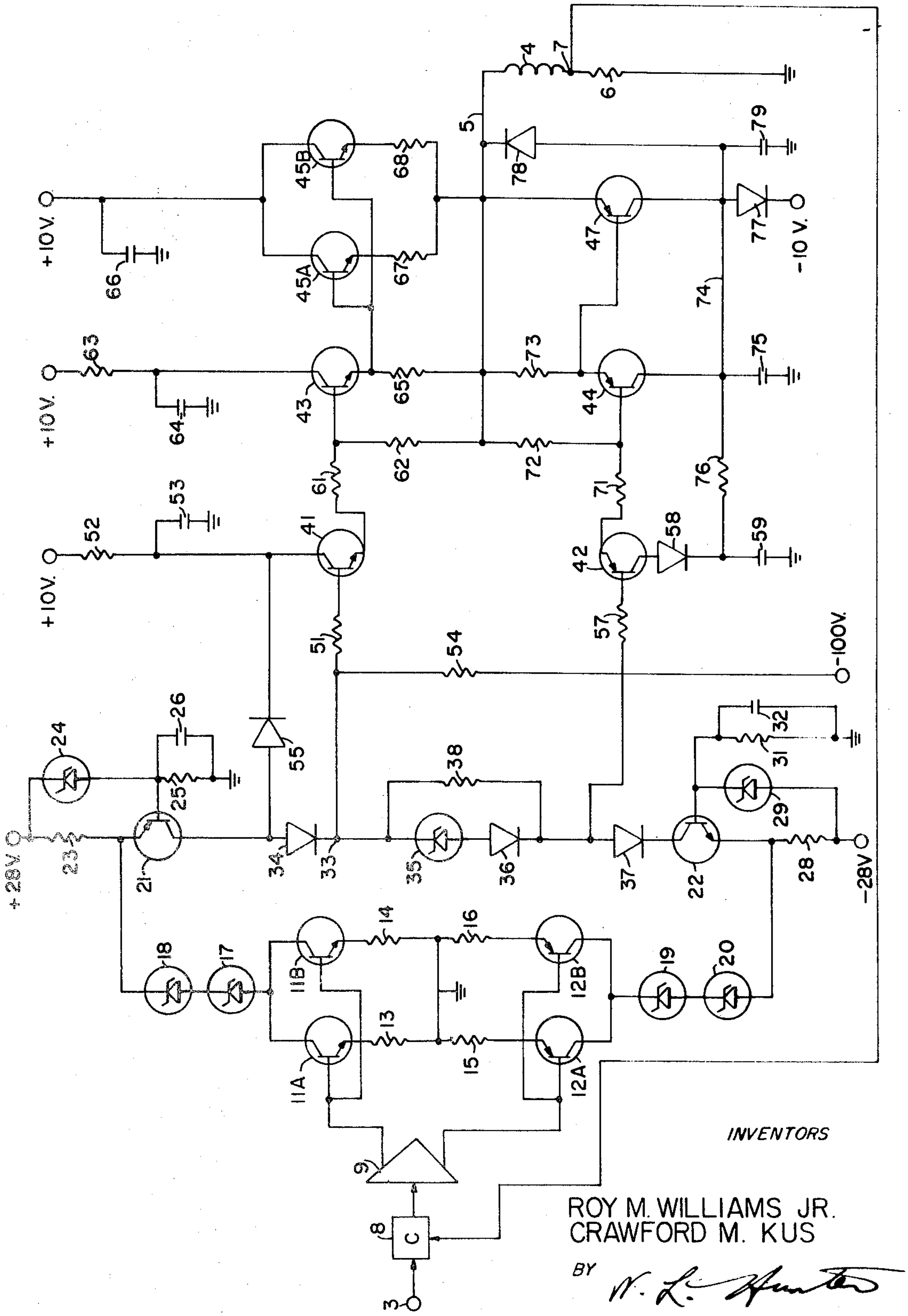
INVENTORS
ROY M. WILLIAMS JR.
CRAWFORD M. KUS
BY
ATTORNEY

DUAL MODE DEFLECTION AMPLIFIER

CROSS REFERENCES

This application discloses subject matter which is disclosed and claimed in the copending application of Roy M. Williams, Jr., Ser. No. 811,093, filed March 27, 1969, and entitled "-Current Steering Amplifier," which is assigned to the same assignee as is the instant application.

FIELD OF THE INVENTION

This invention relates generally to display systems in which information is presented on the screen of a cathode ray tube and particularly to a deflection amplifier for use in such systems which is capable of deflecting the beam either in a random access mode, as used for character generation, or in a raster mode, as used for television-type type presentations.

BACKGROUND OF THE INVENTION

Display systems using cathode ray tubes are versatile and find a variety of applications. They can display information in the form of letters, numbers, vectors, graphs, etc., generally called "Graphics," as well as in pictorial form as in television. Graphics are usually generated by a "random access" technique, that is, the beam is blanked out, directed to the location on the screen where the character is to be displayed, then unblanked and directed so as to cursively trace out the character. When each character is completed, the beam is again blanked out and directed to the location of the next character where the process is repeated. In contrast, television pictures are generated by a raster technique in which the beam scans the entire screen, a line at a time, and is intensity modulated to generate the picture. In each case, the beam is moved as desired about the screen by applying suitable waveforms to orthogonally related (*x* and *y*) deflection coils.

In the random access technique, the waveforms are generated in the first instance at very low power levels and then amplified by linear amplifiers to a level sufficient to force the desired current through the deflection coils. This arrangement is satisfactory because it is capable of moving the beam at speeds adequate for character generation. This arrangement is also satisfactory for the vertical, or "*y*," deflection of the beam in the raster technique 20 because of the relatively slow speeds required. However, this arrangement is less than satisfactory for the horizontal, or "*x*" deflection of the beam in the raster mode of operation. In this mode, the beam travels relatively slowly across the screen from left to right as it traces out each line of the raster. But when each line is completed, the beam must fly back very quickly to the left side so as to start the next line. Such retrace, or fly back, requires a rapid change in the current through the deflection coil and it has been found that a linear amplifier capable of forcing this change is so large in size and uses so much power as to make its use prohibitive for many applications.

In many display systems, it is advantageous to be able to display either graphics or television pictures on the same screen. However, as suggested above, such a capability presents problems regarding the horizontal deflection system. In the past, it has been proposed to sue a linear amplifier of sufficient capacity to force the proper current through the coil. This can be done but is subject to limitations regarding the size of the screen used, the number of frames per second, the size of the amplifier, the voltages required to operate it, and the power consumed by it. Such limitations virtually prohibit the use of such amplifiers where weight and power dissipation are critical, as in vehicles, for example, Alternatively, it has been proposed in the past to provide two deflection systems which may be dual magnetic systems with two yokes or a single yoke supplemented by electrostatic deflection plates, In either case, two amplifiers are required. Such arrangements are awkward and require switching between amplifiers when the kind of display is changed.

It is a general object of the present invention to provide an improved deflection system for display apparatus enabling either graphics or television pictures to be displayed.

Another object is to provide a single deflection amplifier operable in either a linear mode or in an energy recovery mode.

Another object is to provide a dual mode deflection amplifier which operates automatically in either a linear mode or an energy recovery mode, depending upon the waveform applied to its input.

SUMMARY OF THE INVENTION

Briefly stated, the invention comprises an amplifier designated to operate linearly over the range necessary to generate the graphic displays. Additionally, an energy storage capacitor is provided which is isolated by a diode from the remainder of the circuit during normal, linear operation. However, when a waveform is applied to the input commanding the beam to move linearly completely across the screen from left to right, the deflection coil becomes charged. If then the input signal commands the beam to move rapidly from right to left, as for a fly back or retrace, the circuit element through which current had been flowing to the coil is suddenly rendered nonconductive. The voltage across the coil reverses suddenly and the reverse voltage back biases diodes so as to isolate the power supply and so as to disconnect the low level input stages of the amplifier thereby allowing an energy exchange operation to proceed independently of the input signal. More particularly, the coil first discharges fully into the capacitor. Then the capacitor starts to discharge into the coil. As the voltage across the capacitor decreases, the back bias on the diodes is removed so that the input signal regains control, and the current is such as to position the beam at the extreme left of the screen.

BRIEF DESCRIPTION OF THE DRAWING

For a clearer understanding of the invention, reference may be made to the following detailed description and the accompanying drawing, the single FIGURE of which is a schematic diagram of a preferred embodiment of the invention.

DESCRIPTION OF THE PREFERRED EMBODIMENT

Referring now to the drawing, there is shown an input terminal 3 to which is applied a low level voltage waveform indicative of the desired motion of the electron beam. A horizontal deflection coil 4 receives the output of the amplifier and has one terminal connected to a conductor 5 while the other terminal is connected through a small resistor 6 to ground. The amplifier and the coil 4 are designated "horizontal" because, when the television pictures are to be produced, the lines of the raster are usually generated in the horizontal direction. Of course, it is possible to design a system in which the lines are traced vertically in which case the amplifier of the present invention would make a suitable "vertical" amplifier. For present purposes it will be assumed that the amplifier is a "horizontal" amplifier.

The resistor 6 is simply for the purpose of deriving a voltage at the junction 7 which is proportional to the current through the coil 4 and this voltage is applied to a comparing circuit 8 where it is compared with the input voltage so as to generate an error signal, which is applied to a voltage amplifier 9. The amplifier 9 has two identical outputs, one of which is applied to the bases of two parallel connected NPN transistors 11A and 11B, sometimes herein referred to simply as the transistor 11. The other output of the amplifier 9 is connected to the bases of two parallel connected PNP transistors 12A and 12B, similarly sometimes referred to simply as the transistor 12. The biasing circuits for the bases of the transistors 11 and 12 are included in the amplifier 9 and since they are conventional they have not been shown in detail. For present purposes it is sufficient to note that under quiescent conditions with zero signal at the input terminal 3, the bias is such that both transistors are moderately conductive. These transistors are connected in a complimentary symmetrical, common emitter configuration. More particularly, the emitter of transistors 11A, 11B, 12A and 12B are connected through resistors 13, 14, 15 and 16 respectively to ground. The collectors of transistors 11A and 11B are connected together and, through two serially connected Zener diodes 17 and 18, to the emitter of a PNP transistor 21. The collectors of transistors 12A and 12B are connected together and, through two serially connected Zener diodes 19 and 20, to the emitter of an NPN transistor 22. These two transistors are connected in a complementary symmetrical common base configuration. More particularly, the emitter of transistor 21 is also connected through a resistor 23 to a source of positive potential, for example plus 28 volts. This source is also connected to the cathode of a Zener diode 24 the anode of which is connected through a resistor 25 to ground. This resistor is shunted by a capacitor 26 and the junction of the last named resistor, capacitor and Zener diode is connected to the base of the transistor 21. Similarly, the emitter of transistor 22 is connected through a resistor 28 to a source of negative voltage, for example, minus 28 volts. This source is connected to the anode of a Zener diode 29 the cathode of which is connected through a resistor 31 to ground. This resistor is shunted by a capacitor 32 and the junction of the last named resistor, capacitor and Zener diode is connected to the base of the transistor 22. The collector of the transistor 21 is connected to the anode of a diode 34 the cathode of which is connected to the cathode of a Zener diode 35. The anode of the Zener diode 35 is connected to the anode of a diode 36 the cathode of which is connected to the anode of a diode 37. The cathode of the latter is connected to he collector of the transistor 22. A resistor 38 shunts the Zener diode 35 and the diode 36.

The transistors 11, 12, 21 and 22 and their associated circuitry constitute one stage of a "current steeing" amplifier, as fully described and claimed in the aforementioned copending application of Roy M. Williams, Ser. No. 811,093. For present purposes it is sufficient to note that the above described circuit connections of the transistors 21 and Zener diode 24 cause a substantially constant current to flow through the resistor 23. This current is divided between the transistor 11 and the transistor 21. Biasing is selected so that with no signal input at the terminal 3 (and consequently no current through the coil 4), the great majority of the current flows through the Zener diodes 18 and 17 and the transistor 11, with only a relatively small current flowing through the transistor 21. Similarly, a substantially constant current flows through the resistor 28, the majority of which, at zero signal input, flows through the transistor 12 and Zener diodes 19 and 20, while only a small amount flows through the transistor 22. A negative output from the amplifier 9 would cause the transistor 11 to conduct less and the transistor 12 to conduct more thereby "steering" more current through the transistor 21 and less through the transistor 22. Conversely, a positive output from the amplifier 9 would cause the transistor 11 to conduct more and the transistor 12 to conduct less thereby steering more current through the transistor 22 and less through the transistor 21.

The output of the input section of the amplifier comprising the comparing circuit 8, the voltage amplifier 9 and the transistors 11, 12, 21 and 22 is taken from the collector circuits of the transistors 21 and 22 and applied to an output section. The latter section comprises a group of circuit elements or control means, which control the flow of current through the deflection coil 4. These circuit elements are illustrated as comprising transistors connected as a series of cascaded, complementary symmetrical, emitter follower stages. The first stage comprises an NPN transistor 41 and a PNP transistor 42, the second stage comprises an NPN transistor 43 and a PNP transistor 44, and the third stage comprises a pair of NPN transistors 45A and 45B connected in parallel, sometimes referred to simply as the transistor 45, and a PNP transistor 47. These transistors are connected and biased so that with zero input, they all pass a small amount of current. As more current is "steered" through the transistor 21 and less through the transistor 22, the transistors 41, 43 and 45 become more conductive while the transistors 42, 44 and 47 become less conductive. Conversely, as less current is "steered" through the transistor 21 and more through the transistor 22, the transistors 41, 43 and 45 become less conductive while the transistors 42, 44 and 47 become more conductive.

Describing the connections more specifically, the junction 33 of the diode 34 and the Zener diode 35 is connected through a resistor 51 to the base 15 of the transistor 41, the collector of which is connected trough a resistor 52 to a source of positive potential, such as plus 10 volts. A capacitor 53 is connected between this collector and ground. The terminal of the resistor 51 remote from the base is connected through a large resistor 54 to a source of highly negative potential, for example, minus 100 volts, for a purpose which will appear. The anode of a diode 55 is connected to the junction of the collector of the transistor 21 and the anode of the diode 34. The cathode of the diode 55 connected to the collector of the transistor 41 to prevent saturation of the latter under unfavorable voltage conditions. The junction of the cathode of the diode 36 and the anode of the diode 37 is connected through a resistor 57 to the base of the transistor 42 the collector of which is connected to the anode of a diode 58. The cathode of this diode is connected to one terminal of a capacitor 59, the other terminal of which is grounded.

The emitter of the transistor 41 is connected through a resistor 61 to the base of the transistor 43, which is also connected through a resistor 62 to the common conductor 5. The collector of the transistor 43 is connected through a resistor 63 to a source of positive potential such as plus 10 volts. A capacitor 64 is connected between this collector and ground. The emitter of transistor 43 is connected through a resistor 65 to the common conductor 5 and is also connected to the bases of both of the transistors 45A and 45B. The collectors of these transistors are connected together and to a source of positive potential such as plus 10 volts and are also connected to one terminal of a capacitor 66 the other terminal of which is grounded. The emitters of the transistors 45A and 45B are connected through small resistors 67 and 68 respectively to the common conductor 5. For the particular design requirements of the amplifier being described and giving consideration to the transistor types available and used elsewhere, it was found expedient to use two identical transistors 45A and 45B connected in parallel, although obviously this is not essential.

The emitter of the transistor 42 is connected through a resistor 71 to the base of the transistor 44 which is also connected through a resistor 72 to the common conductor 5. The emitter of the transistor 44 is connected through a resistor 73 to the common conductor 5 while the collector of this transistor is connected to a conductor 74. This conductor is connected to one terminal of a capacitor 75 the other terminal of which is grounded. The conductor 74 is also connected through a resistor 76 to the junction of the diode 58 and the capacitor 59. The emitter of the transistor 44 is connected to the base of the transistor 47. The emitter of the transistor 47 is connected to the common conductor 5 while the collector is connected to the conductor 74 and to the anode of a diode 77, the cathode of which is connected to a source of negative potential such as minus 10 volts. A diode 78 has its cathode connected to the conductor 5 and its anode connected to the conductor 74 and to one terminal of a capacitor 79, the other terminal of which is grounded.

OPERATION

As previously mentioned, the amplifier operates in the random access mode to move the beam from any position on the screen directly to any other position. Let it be assumed that the system has been designed so that with no voltage input at terminal 3 and no current through the coil 4, the beam is at the center of the screen. Let it further be assumed that the beam is positioned to the right of the center by a current flowing from the common conductor 5 through the coil 4 to ground and that it is positioned to the left of center by a current in the opposite direction. If it is desired to move the beam to the right, a negative going ramp voltage is applied to the input terminal 3. Initially there is no feedback and accordingly a sharply falling voltage appears at the output of amplifier 9 (which has no polarity reversal). As previously explained, such a voltage causes a decrease in the conductivity of the transistor 11, and an increase in the conductivity of transistor 12, thereby "-steering" more current through the transistor 21 and less through the transistor 22. As a result, the transistor 45 conducts heavily and the transistor 47 conducts little, if at all. The current through the coil 4 builds up, moving the beam to the right, and generating a feedback signal at the junction 7 which is applied the comparing circuit 8 so as to be combined with the input signal to stop the beam at the desired location. If the beam is next to be moved to the left of center, the required input signal will be a positive going ramp voltage, increasing from its previous negative value and then becoming positive. The transistor 45 will then decrease in conductivity while the transistor 47 will increase. The current through the coil 4 will decrease to zero, and then reverse as transistor 47 conducts more than transistor 45.

It is to be noted that throughout the above operation, the capacitors 79, 75 and 59 (sometimes herein called collectively the storage capacitor) are charged to just under the voltage of the negative supply (due to the drop in the diode 77) thereby back biasing the diode 78 so that these capacitors are in effect isolated from the remainder of the circuit and their charge does not vary appreciably regardless of the direction of current flow through the deflection coil 4.

Let it be assumed that it is now desired to exhibit a television picture. A raster must be generated and, considering only horizontal motion, the beam must travel at a uniform rate across the screen from left to the extreme right and then must fly back quickly to the extreme left so as to repeat the motion. Accordingly a sawtooth voltage waveform is applied to the input terminal. The input voltage decreases linearly from a maximum positive value through zero to a maximum negative value and then rises sharply to the maximum positive value. As the voltage is decreasing, the circuit operates as previously explained with the transistor 47 conducting less and less, the transistor 45 conducting more and more, and the current through the coil 4 first decreasing to zero and then increasing to a maximum value in the opposite direction. As the current builds up, the coil becomes charged. When the beam reaches the extreme right, the input voltage suddenly rises and the transistors 21, 41, 43 and 45 are driven rapidly towards cutoff, thereby interrupting the flow of current to the coil 4. As the magnetic field associated with the coil 4 starts to collapse, the voltage across the coil reverses, thus rapidly reducing the voltage of the common conductor 5 from its former positive value to a rapidly decreasing negative value. This tends to turn the transistors 41, 43 and 45 back on again. The discharge of the base-emitter capacitance of the transistors 41, 43 and 45 must be rapid enough to prevent this turn on. As the voltage of coil 4 reverses, the coil starts to discharge through the resistor 6, the capacitors 79, 75 (and to a lesser extent the capacitor 59), and the diode 78. As the capacitors charge the voltage of conductor 74 falls. As the voltage of conductors 5 and 74 fall, several things occur.

As the voltage of conductor 74 approaches −10 volts, the diode 77 is back biased thereby disconnecting the −10 volt supply so as to prevent the storage capacitor from discharging therethrough.

The positive going input voltage "steered" more current into the transistor 22 and this transistor starts to conduct, drawing current through the diode 37 and starting to reduce the potential of this diode from its former value near ground towards that of the negative source. This current comes largely from the discharge of the base emitter capacitance of the transistor 41. As the potential of the anode of the diode 37 falls to about −10 volts, it would, in the absence of the diode 58, draw current through the now forward biased collector-base junction of the transistor 42. However, the diode 58 prevents such forward bias and allows the potential of the diode 37 to fall below −10 volts so as to continue to discharge the base-emitter capacitance of the transistor 41 and to establish a reverse bias so as to aid in turning it off quickly.

The Zener diode 35 is part of a voltage divider which biases the transistors 41 and 42. It has a significant amount of inherent capacitance. When the transistor 21 is cut off, this capacitance would, in the absence of the diode 36 and the resistor 38, discharge into the base of the transistor 41, thus prolonging its conductively. The diode 36 has a very small capacitance compared to that of the Zener diode 35 and is connected in series therewith so that the total capacitance of the combination appears to be substantially that of the diode 36 alone. The resistor 38 shunting the combination provides for quick discharge thereof.

The falling voltage of the conductor 5, due to the voltage reversal across the coil 4 during flyback is transmitted through the base-emitter diodes of the transistors 45, 43 and 41 and the resistor 51 to the junction 33 between the diode 34 and the Zener diode 35. This falling voltage soon back biases the diode 34 and the Zener diode 35. This falling voltage soon back biases the diode 37 thus effectively disconnecting the preamplifier section from the emitter follower stages thereby allowing the energy storage and recovery cycle to continue in a resonant flyback mode without preamplifier control.

In order to prevent the base of the transistor 41 from being left virtually disconnected, after cutoff of the transistor 21 by the input voltage calling for flyback and after back biasing of the diode 37, a highly negative supply, for example minus 100 volts, is connected through a large resistor 54 to the end of the resistor 51 remote from the base. The supply must be more negative than the voltage to which the conductor 5 falls during flyback. This connection prevents the otherwise floating base-emitter junction from becoming forward biased after the preamplifier has been disconnected.

As previously mentioned, when the transistor 45 is cut off, the voltage across the coil 4 reverses and, in the specific embodiment of the invention being described, may reach a value of minus 80 volts. It immediately starts to discharge into the capacitors 79, 75 and 59. As it does so, the current through the coil 4 decreases, soon reaching zero, at which time the beam will have been brought to approximately the center of the screen and the energy formerly in the coil will have been transferred to the storage capacitor. Then the capacitor starts to discharge into the coil, sending current therethrough in the opposite direction, moving the beam to the left of center, and transferring its energy back to the coil. As the voltage of the conductor 5 returns toward zero, the back bias on the preamplifier disconnect diode 37 and that on the diode 77 are removed and the preamplifier regains control. The amplifier is then in condition to accept either a signal commanding another line of the raster to be traced or a random access signal commanding the beam to move to any other position.

CONCLUSION

From the foregoing it is apparent that the present invention enables a single amplifier and a single deflection coil to be used for horizontal deflection in either the random access mode of operation or for raster generation. The mode of operation is selected simply by applying a low level signal indicative of the desired beam motion to the input of the amplifier. No switching is required. The power consumed is moderate because energy recovery techniques are used for raster generation.

Although a preferred embodiment of the invention has been described in considerable detail for illustrative purposes, many modifications within the spirit of the invention will occur to those skilled in the art. It is therefore desired that the protection afforded by Letters Patent be limited only by the true scope of the appended claims:

What is claimed is:

1. A deflection amplifier for energizing the deflection coil of a cathode ray tube so as to move the beam of said tube in either a random access mode or in a raster mode, comprising, an input section for receiving an input signal indicative of the desired motion of said beam, an output section connected to said input section and including a plurality of transistors connected in complementary symmetrical emitter follower configuration with all of the emitters returned to a common conductor, said coil being connected between said common conductor and ground, a capacitor having one terminal connected to ground, and a diode connected between the other terminal of said capacitor and said common conductor, whereby an input signal commanding a rapid reversal of the direction of motion of said beam cuts off the flow of current to said coil causing a polarity reversal of the voltage across said coil, and whereby a discharge path for said coils is provided through said capacitor and said diode, and whereby said capacitor can discharge through a path including said coil and one of said transistors.

2. A deflection amplifier in accordance with claim 1 including means responsive to the polarity reversal of the voltage across said coil for disconnecting said input section from said output section.

3. A deflection amplifier in accordance with claim 1 in which said input section is connected to said output section through a diode which is forward biased during normal operation but which is back biased upon reversal of the polarity of the voltage across said coil.

4. A deflection amplifier in accordance with claim 1 in which said input section includes means for comparing said input signal with a signal indicative of current through said coil to generate an error signal for controlling said amplifier.

5. A deflection amplifier in accordance with claim 1 in which said input section has a bias circuit including a Zener diode and in which the effect of the inherent capacitance of said Zener diode is reduced by connecting a conventional diode in series therewith and shunting the series combination with a resistor.

6. A deflection amplifier in accordance with claim 1 in which said output section includes a plurality of NPN transistors having their collectors energized from a source of positive potential and their emitters returned to said common conductor and which also includes a plurality of PNP transistors having their collectors energized from a source of negative potential and their emitters returned to said common conductor.

7. A deflection amplifier in accordance with claim 6, in which one of said NPN transistors is maintained nonconductive during discharge of said capacitor by applying reverse bias to the base-emitter circuit thereof.

8. A deflection amplifier in accordance with claim 6 in which the cathode of said diode is connected to said common conductor and the anode of said diode is connected to said capacitor and to the collectors of said PNP transistors.

9. A deflection amplifier in accordance with claim 8 which includes another diode connected between said source of negative potential and said collectors of said PNP transistors, whereby discharge of said coil back biases said last named diode and isolates said source of negative potential.

10. A deflection amplifier in accordance with claim 9 in which said input section is connected to said PNP transistors through an additional diode connected to be normally forward biased but which is back biased by the presence of a predetermined negative potential on said common conductor, whereby said input section is isolated from said output section for the duration of said predetermined potential.

11. A deflection amplifier in accordance with claim 10 in which forward biasing of the collector-base diode of one of said PNP transistors is prevented by a diode connected in series with said collector.

12. A deflection amplifier for energizing the deflection coil of a cathode ray tube, comprising a first path for the flow of current from a source through said coil, means for controlling the flow of current through said path and said coil in accordance with an input signal, a capacitor, and a diode, said capacitor and said diode being connected in series with each other and with the series combination shunting said coil, said diode being poled so as to prevent the charging of said capacitor from said source but so as to be rendered conductive by an interruption of the flow of current through said first path and the resulting voltage polarity reversal across said coil thereby establishing a second path enabling said coil to discharge into said capacitor.

13. A deflection amplifier for energizing the deflection coil of a cathode ray tube, comprising, first and second control means connected to said coil for controlling the flow of current therethrough in first and second directions in accordance with the relative conductivity of said control means, circuit means connected to said first and second control means for controlling the relative conductivity thereof in response to an input signal, a capacitor, means responsive to a sudden reduction in the conductivity of said first control means for establishing a first path through which said coil may discharge into and charge said capacitor, and means responsive to the discharging of said coil and the charging of said capacitor for establishing a second path including said second control means through which said capacitor may discharge into said coil.

14. A deflection amplifier in accordance with claim 13 in which said first path includes a diode to which is applied a back bias large enough to maintain said diode nonconductive during gradual changes in the conductivity of said first control means but small enough to be overcome by the polarity reversal across said coil which occurs upon sudden reduction in the conductivity of said first control means.